Aug. 22, 1967 W. N. WAINWRIGHT ETAL 3,337,841

UNDERWATER TELEPHONE

Filed April 9, 1957 12 Sheets-Sheet 1

INVENTOR.
WALTER N. WAINWRIGHT
RUSSELL I. MASON
VICTOR SAVCHUK, JR.
STANLEY L. EHRLICH
George Sipkin
ATTORNEY INVENTOR.
WALTER N. WAINWRIGHT
RUSSELL I. MASON
VICTOR SAVCHUK, JR.
STANLEY L. EHRLICH
George Sipkin
ATTORNEY INVENTOR.
WALTER N. WAINWRIGHT
RUSSELL I. MASON
VICTOR SAVCHUK, JR.
STANLEY L. EHRLICH
George Lipkin
ATTORNEY INVENTOR.
WALTER N. WAINWRIGHT
RUSSELL I. MASON
VICTOR SAVCHUK, JR.
STANLEY L. EHRLICH
George Sipkin
ATTORNEY INVENTOR.
WALTER N. WAINWRIGHT
RUSSELL I. MASON
VICTOR SAVCHUK, JR.
STANLEY L. EHRLICH
George Sipkin
ATTORNEY

UNDERWATER TELEPHONE

Filed April 9, 1957

INVENTOR
WALTER W. WAINWRIGHT
RUSSELL I. MASON
VICTOR SAVCHUK, JR
STANLEY L. EHRLICH
George [signature]
ATTORNEY INVENTOR
WALTER N. WAINWRIGHT
RUSSELL I. MASON
VICTOR SAVCHUK, JR
STANLEY L. EHRLICH
George Lipkin
ATTORNEY INVENTOR
WALTER N. WAINWRIGHT
RUSSELL I. MASON
VICTOR SAVCHUK, JR.
STANLEY L. EHRLICH
George Lipkin
ATTORNEY Aug. 22, 1967 W. N. WAINWRIGHT ETAL 3,337,841

UNDERWATER TELEPHONE

Filed April 9, 1957

12 Sheets-Sheet 9

INVENTOR
WALTER N. WAINWRIGHT
RUSSELL I. MASON
VICTOR SAVCHUK, JR.
STANLEY L. EHRLICH

George Sipkin
ATTORNEY

INVENTOR
WALTER N. WAINWRIGHT
RUSSELL I. MASON
VICTOR SAVCHUCK, JR.
STANLEY L. EARLICH
George Lipkin
ATTORNEY

UNDERWATER TELEPHONE

Filed April 9, 1957

INVENTOR
WALTER N. WAINWRIGHT
RUSSELL I. MASON
VICTOR SAVCHUK, JR.
STANLEY L. EHRLICH
George Sipkin
ATTORNEY Aug. 22, 1967 W. N. WAINWRIGHT ETAL 3,337,841

UNDERWATER TELEPHONE

Filed April 9, 1957

12 Sheets-Sheet 12

INVENTOR
WALTER N. WAINWRIGH
RUSSELL I. MASON
VICTOR SAVCHUK, JR.
STANLEY L. EHRLICH
George Lipkin
ATTORNEY United States Patent Office 3,337,841
Patented Aug. 22, 1967

3,337,841
UNDERWATER TELEPHONE

Walter N. Wainwright, Waterford, Conn., Russell I. Mason, Barneveld, and Victor Savchuk, Jr., Rochester, N.Y., and Stanley L. Ehrlich, Waltham, Mass., assignors to the United States of America as represented by the Secretary of the Navy Filed Apr. 9, 1957, Ser. No. 651,767
8 Claims. (Cl. 340—5)

The invention described herein may be manufactured and used by or for the Government of the United States of America for governmental purposes without the payment of any royalties thereon or therefor.

This invention relates to underwater communication equipment wherever communication under water is desired and has particular application to portable voice communication equipment for underwater swimmers.

Within the last decade, underwater activities of free swimmers who carry their breathing supplies with them in the water have expanded greatly in scope and range. One of the major obstacles impeding further expansion of underwater activities of free swimmers has been the absence of direct communication among swimmers of a team or between any one swimmer and his base of operation, whether the base be on a ship or on shore.

This invention is useful for communication under water between any separated points, but a particularly useful application of it concerns portable voice communication equipment. Such equipment includes a microphone, a headset, a transducer, and a transmitter-receiver. The microphone is usually mounted in a mask to be worn by the swimmer and is positioned in the mask so as to be as close to the lips of the swimmer as possible. The headset is adapted for underwater use. The transducer approximates a flashlight in shape and size so that the swimmer can easily hold it in one hand and direct it where he wishes or the swimmer can clip it to a belt around his waist. The transmitter-receiver is as small as current miniaturization techniques permit; it is packaged to be no larger than several inches in its largest dimension and adapted to be easily clipped to the swimmer's belt. Waterproof leads extend from the several portions of the equipment. Watertight plug connectors whose mating portions are readily separable in case of emergency, are provided in the leads coupling the several portions of the equipment. The equipment permits underwater swimmers to speak with one another even when they are spaced a considerable distance apart and also permits an underwater swimmer to be in voice communication with a mother ship or a shore base miles away. The equipment also can be used to generate a constant-frequency constant-amplitude signal; this signal is hereinafter referred to as a homing tone since the swimmer relies upon it as an aid in returning to his base.

An object of this invention is to provide improved underwater communication equipment.

A further object is to provide an improved underwater telephone.

A further object is to provide a portable voice communication equipment for underwater swimmers.

Another object is to provide a relatively simple, sensitive, compact, efficient and practical underwater telephone.

Other objects and many of the attendant advantages of this invention will be readily appreciated as the same becomes better understood by reference to the following detailed description of one embodiment of the invention, when considered in connection with the accompanying drawings wherein.

Figure 1:
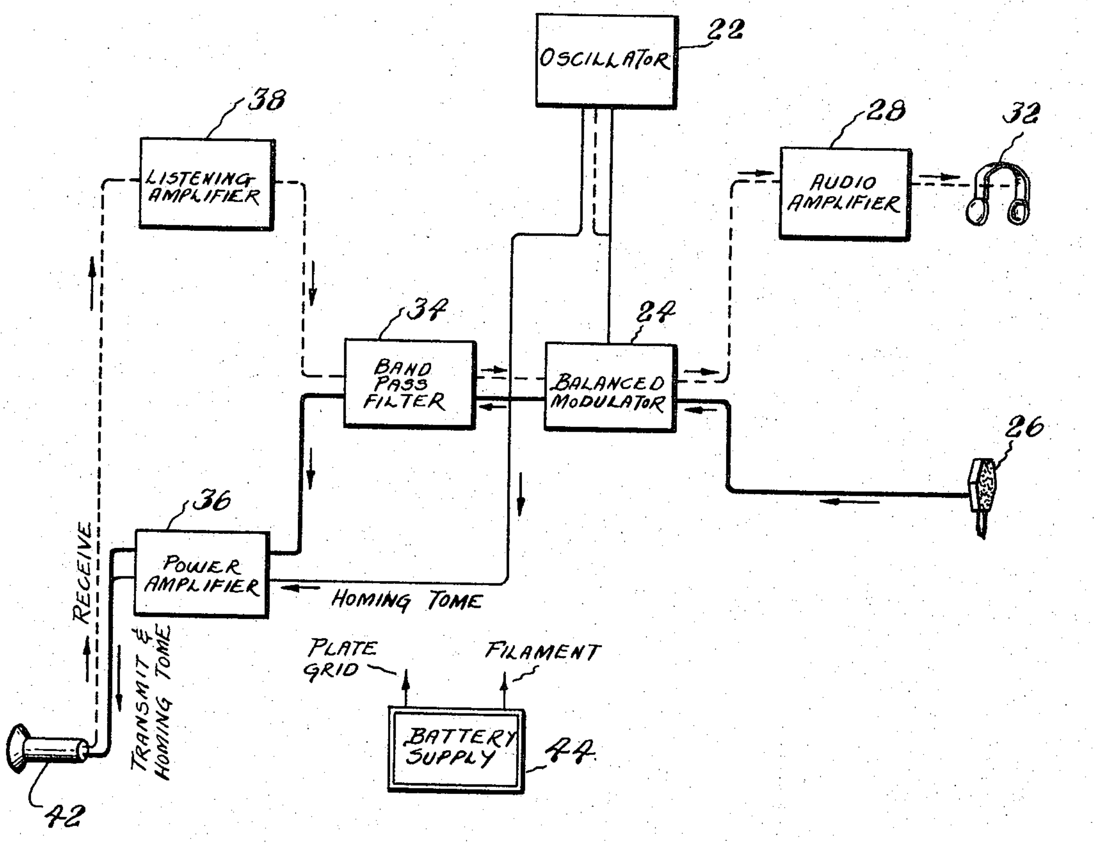
FIG. 1 is a block diagram of the invention illustrating generally the circuit arrangement during receive, transmit, and homing tone conditions of operation.
Figure 2:
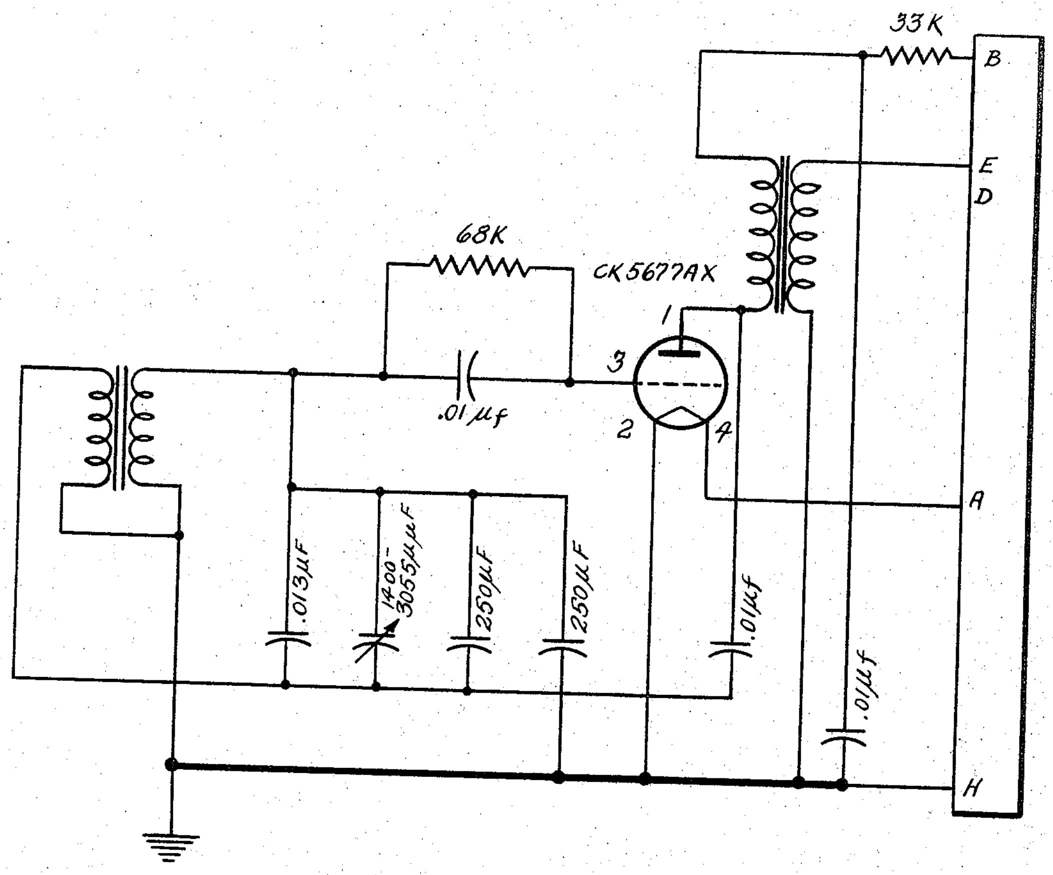
FIG. 2 is a schematic diagram of a preferred oscillator plug-in unit for this invention.
Figure 3:
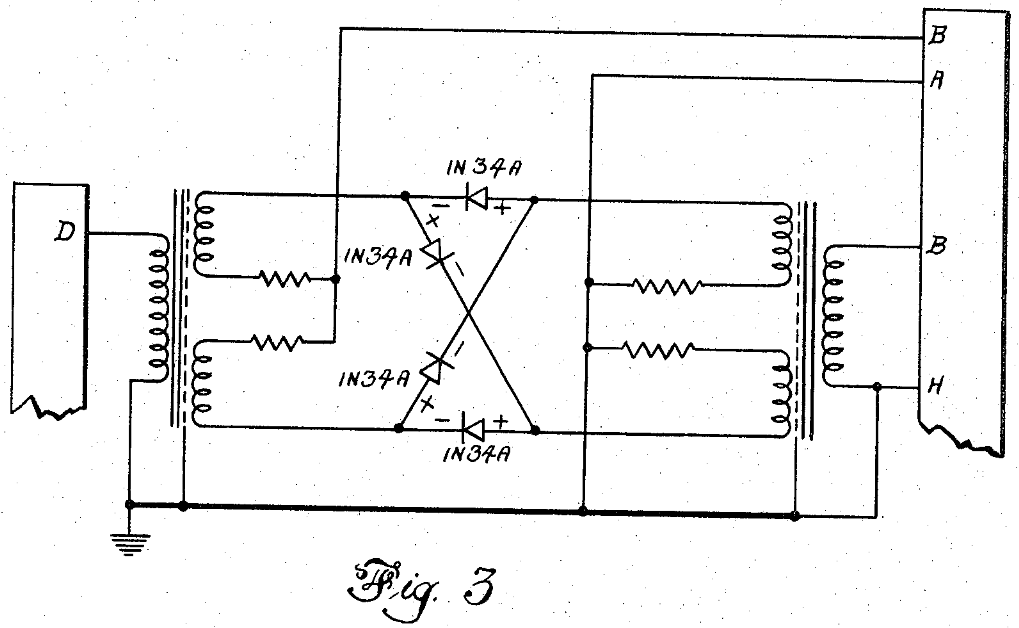
FIG. 3 is a schematic diagram of a preferred balanced modulator plug-in unit for this invention.
Figure 4:
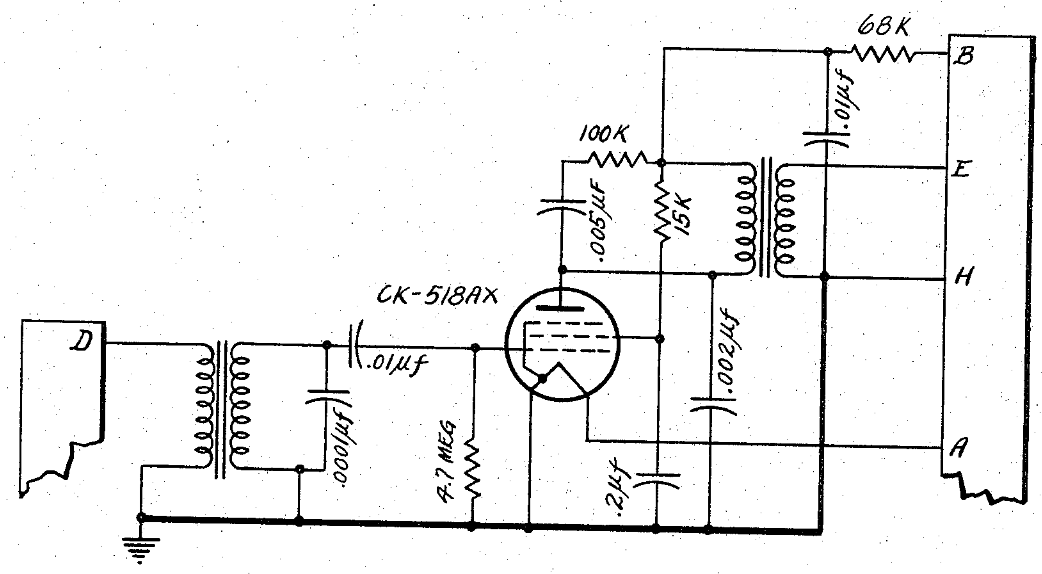
FIG. 4 is a schematic diagram of a preferred audio amplifier plug-in unit for this invention.
Figure 5:
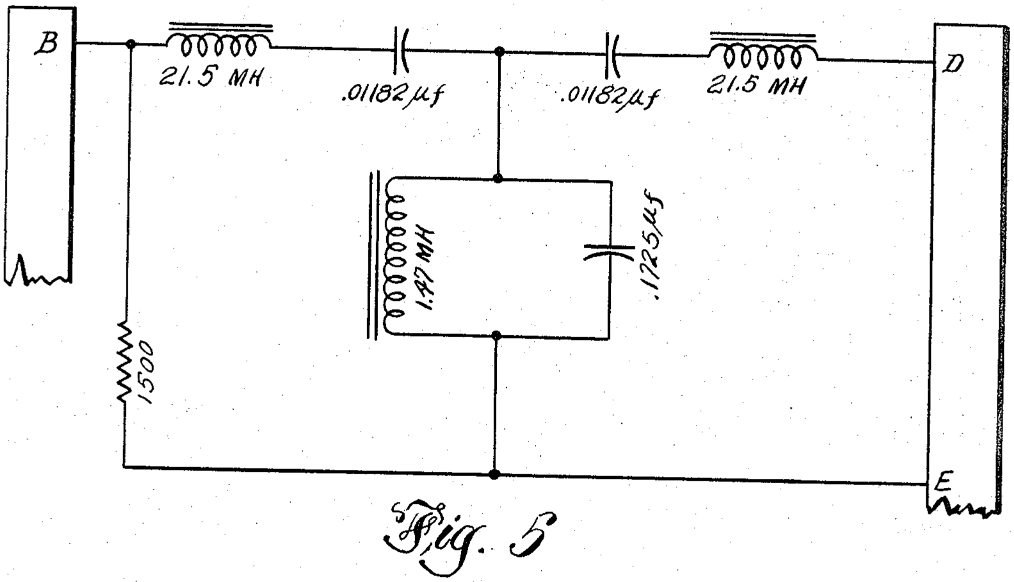
FIG. 5 is a schematic diagram of a preferred band-pass filter plug-in unit for this invention.
Figure 6:
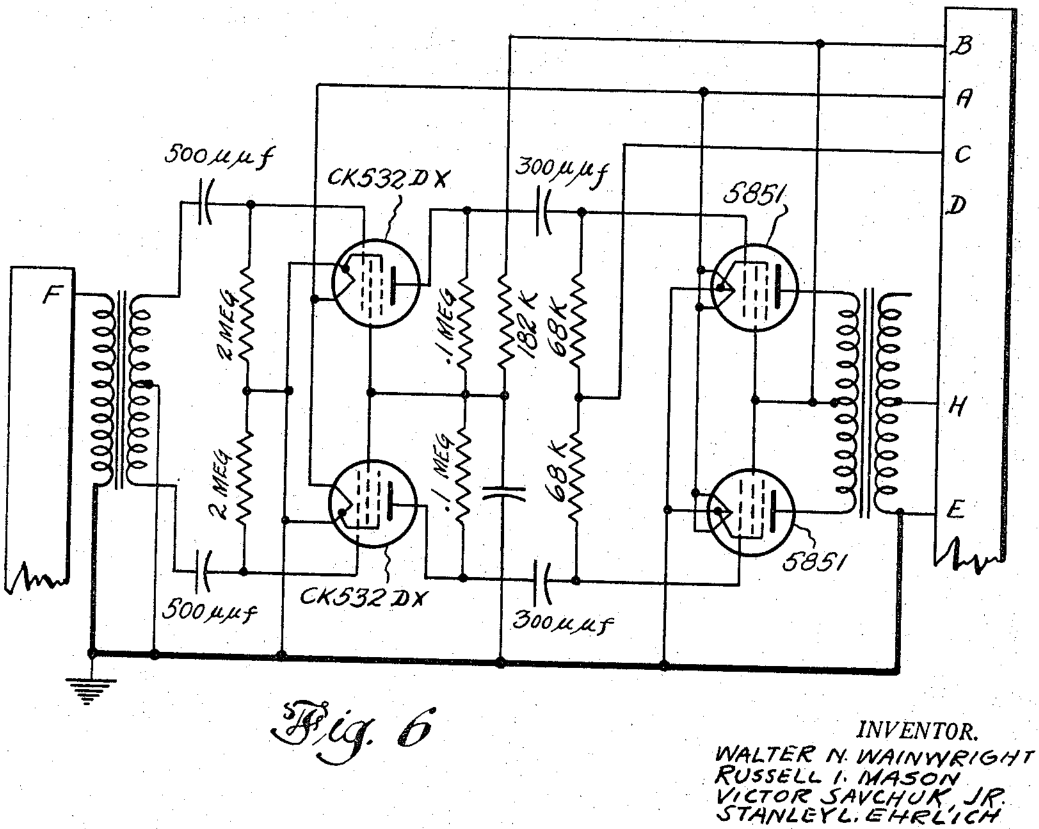
FIG. 6 is a schematic diagram of a preferred power-amplifier plug-in unit for this invention.
Figure 7:
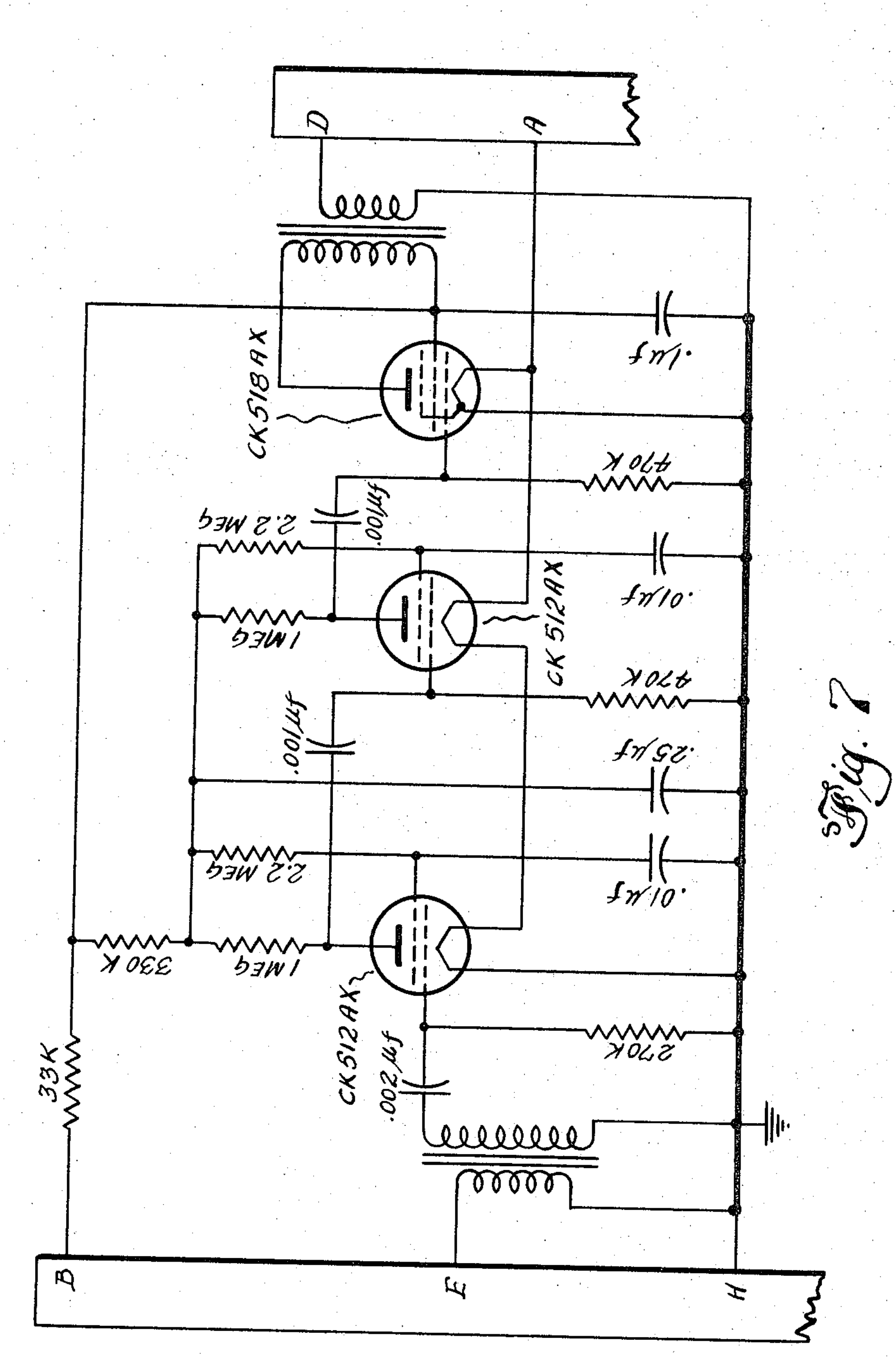
FIG. 7 is a schematic diagram of a preferred listening amplifier plug-in unit for this invention.

The equipment as used in a portable communication system, for example, is illustrated in broad outline in FIG. 1. It includes a fixed frequency oscillator 22, a balanced modulator 24, a microphone 26, an audio amplifier 28, a headset 32, a bandpass filter 34, a power amplifier 36, a listening amplifier 38, a transducer 42, and a battery supply 44. Switches are omitted in this figure. The thicker solid black lines represent the connections for speech transmittal. The thinner solid black lines represent the connections for homing tone generation. The broken lines represent the connections for reception. For the sake of simplicity the battery supply connections to the various portions of the equipment are not shown; when the battery supply is not connected, the equipment is inactive. Concerning the homing tone, the homing tone frequency and the frequency of the energy fed from the oscillator to the balanced modulator are different; in other words the oscillator can generate two frequencies. The advantage of this operating arrangement over one in which the two frequencies are identical is that the homing tone is received more clearly at the swimmer's base. If the frequencies are identical, the homing tone corresponds to the carrier frequency and hence corresponds to the end of the favored sideband or is even outside the frequency range of the favored sideband. By selecting a homing tone frequency well within the favored sideband, the homing tone is more clearly received. However in the remainder of this description, the homing tone frequency is the same as the carrier frequency; this is an expedient for simplifying the description. The transmit-receive-homing tone switching means can be readily connected so as to cut in and cut out a selected reactive portion of the oscillator 22 to produce a homing tone of different frequency from the carrier frequency.

In FIGS. 2–7 there is illustrated in detail each of the major circuit portions of the equipment. These circuit portions taken singly are substantially conventional and hence are not discussed in detail. Specimens of equipment in accordance with this invention and including the circuit details shown in FIGS. 2–7, performed satisfactorily. The major circuit portion shown in each figure is preferably constructed as a plug-in unit. The element shown in part at the right and in part at the left of each figure represents the plug for that circuit portion. The letters on the plugs correspond to those indicated in FIG. 8.

Figure 8:
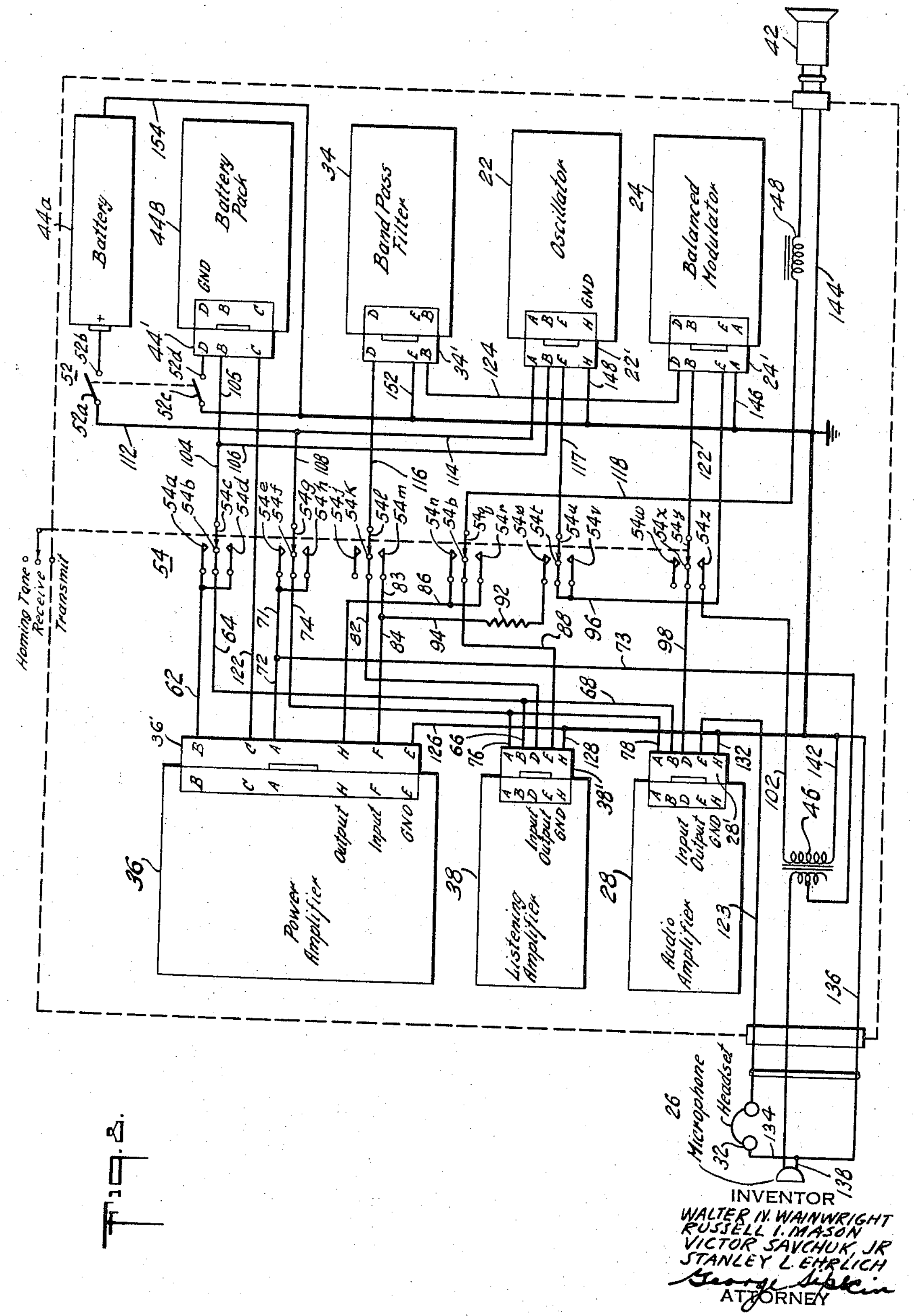
FIG. 8 is a block diagram of the invention in greater detail than in FIG. 1.

The equipment is illustrated in block diagram form in FIG. 8. The transmitter-receiver is shown within the broken line block. As described above the transmitter-receiver includes six major circuit portions, namely a power amplifier 36, a listening amplifier 38, an audio amplifier 28, a bandpass filter 34, an oscilltor 22, and a balanced modulator 24. The circuit portions seat in sockets 36', 38', 28', 34', 22', and 24', respectively. A filament battery 44A and a plate and grid bias battery pack 44B are provided for powering the six circuit portions and the microphone circuit. A microphone transformer 46 is connected to the microphone 26 and a choke 48 is connected in series with the transducer. Only two controls are provided on the transmitter-receiver to minimize fumbling and confusion on the part of the swimmer. The two controls include an on-off switch 52 for connecting or disconnecting the batteries 44A and 44B from the several circuit portions, and a ganged switch 54 for connecting the circuit portions for receiving or transmitting voice or transmitting a homing tone; the actuator of switch 54 is spring-biased to its center position which corresponds to receive.

The contact 54*a* is connected by lead 62 to the terminal B of the socket 36'; the terminal B of the socket 36' is connected to the plate circuit of the power amplifier 36. The contact 54*b* is connected by leads 64 and 66 to the terminal B of the socket 38'; the terminal B of socket 38' is connected to the plate circuit of listening amplifier 38. The contact 54*b* is also connected by leads 64 and 68 to the terminal B of socket 28'; the terminal B of socket 28' is connected to the plate circuit of the audio amplifier 28. The contact 54*d* is connected in common with the contact 54*a*. The contact 54*e* is connected by leads 71 and 72 to the terminal A of socket 36'; the terminal A of socket 36' is connected to the filament circuit of the power amplifier 36. The contact 54*e* is also connected by leads 71 and 73 to the series-connected primary of transformer 46 and microphone 26. The contact 54*f* is connected by leads 74 and 76 to terminal A of the socket 38'; the terminal A of socket 38' is connected to the filament circuit of the listening amplifier 38. The contact 54*f* is also connected by leads 74 and 78 to the terminal A of socket 78; the terminal A of socket 78 is connected to the filament circuit of the audio amplifier 28. The contact 54*h* is connected in common with the contact 54*e*. The contact 54*j* is a dummy. The contact 54*k* is connected by lead 82 to the terminal D of the socket 38'; the terminal D of the socket 38' is connected to the output of listening amplifier 38. The contact 54*m* is connected by leads 83 and 84 to the terminal F of socket 36'; the terminal F of socket 36' is connected to the input of power amplifier 36. The contact 54*n* is connected by lead 86 to the terminal H of socket 36'; the terminal H of socket 36' is connected to the output of power amplifier 36. The contact 54*p* is connected by lead 88 to the terminal E of socket 38'; the terminal E of socket 38' is connected to the input of listening amplifier 38. The contact 54*r* is connected in common with contact 54*n*. The contact 54*s* is connected in series with resistor 92 which in turn is connected by leads 94 and 84 to the terminal F of socket 36'; the terminal F or socket 36' is connected to the input of power amplifier 36. The contact 54*t* is connected by lead 96 to the terminal E of the socket 34'; the terminal E of the socket 24' is connected to the carrier frequency input terminal of the balanced modulator 24. The contact 54*v* is connected in common with contact 54*t*. Contact 54*w* is a dummy. Contact 54*x* is connected by lead 98 to the terminal D of socket 28'; the terminal D of socket 28' is connected to the input of audio amplifier 28. Contact 54*z* is connected by lead 102 to the output of the secondary of microphone transformer 46.

The contactor 54*c* is connected by leads 104 and 105 to the terminal B of socket 44'; the terminal B of socket 44' is connected to plate supply terminal of the battery pack 44B. The contactor 54C is also connected by leads 104 and 106 to the terminal B of socket 22'; the terminal B of socket 22' is connected to the plate circuit of the oscillator 22. The contactor 54*g* is connected by leads 108 and 112 to contactor 52*a* of switch 52. The fixed contact 52*b*, adapted to be engaged by contactor 52*a* is connected to the ungrounded terminal of the filament battery 44B. The contactor 52*a* is also connected by leads 112 and 114 to the terminal A of socket 22'; the terminal A of socket 22' is connected to the filament circuit of the oscillator 22. The contactor 54*l* of switch 54 is connected by lead 116 to terminal D of socket 34'; terminal D of socket 34' is connected to one end of the bandpass filter 34. The contactor 54*q* is connected by means of lead 118 to the high frequency choke 48 which in turn is connected to the transducer 42. The contactor 54*u* is connected by lead 117 to the terminal E of the socket 22'; the terminal E of socket 22' is connected to the output terminal of the oscillator 22. Contactor 54*y* is connected by lead 122 to the B of socket 24'; the terminal B of socket 24' is connected to one end of the balanced modulator 24. The contactor 52*c* of switch 52 is connected to ground. The contact 52*d* adapted to be engaged by contact 52*c* is connected to the terminal D of socket 44'; the terminal D of socket 44' is connected to the common ground of the battery pack 44B. The terminal C of socket 44' is connected to the terminal C of socket 36' whereby grid bias voltage is applied by the battery pack 44B to the power amplifier 36. The terminal E of socket 28' is connected to headset 32 for coupling the amplified received signal energy from the audio amplifier 28 to the headset. The terminal E of socket 28' is connected by lead 123 to headset 32 for coupling the amplified received signal energy from the audio amplifier 28 to the headset. The terminal B of socket 34' is connected by lead 124 to terminal D of socket 24' whereby one end of the band pass filter 34 is connected to one end of the balanced modulator 24. Each of the circuit portions are connected to ground, i.e., the same source of reference potential. The terminal E of socket 36' is connected by lead 126 to ground. The terminal H of socket 38' is connected by lead 128 to ground. The terminal H of socket 28' is connected by lead 132 to ground. One side of headset 32 is connected by leads 134 and 136 to ground. One side of microphone 26 is connected by leads 138 and 136 to ground. One side of the secondary of microphone transformer 46 is connected by lead 143 to ground. One side of transducer 42 is connected by lead 144 to ground. The terminal A of socket 24' is connected by lead 146 to ground. The terminal H of socket 22' is connected by lead 148 to ground. The terminal E of socket 34' is connected to lead 152 to ground. The negative side of battery 44A is connected by lead 154 to ground.

Figure 9B:
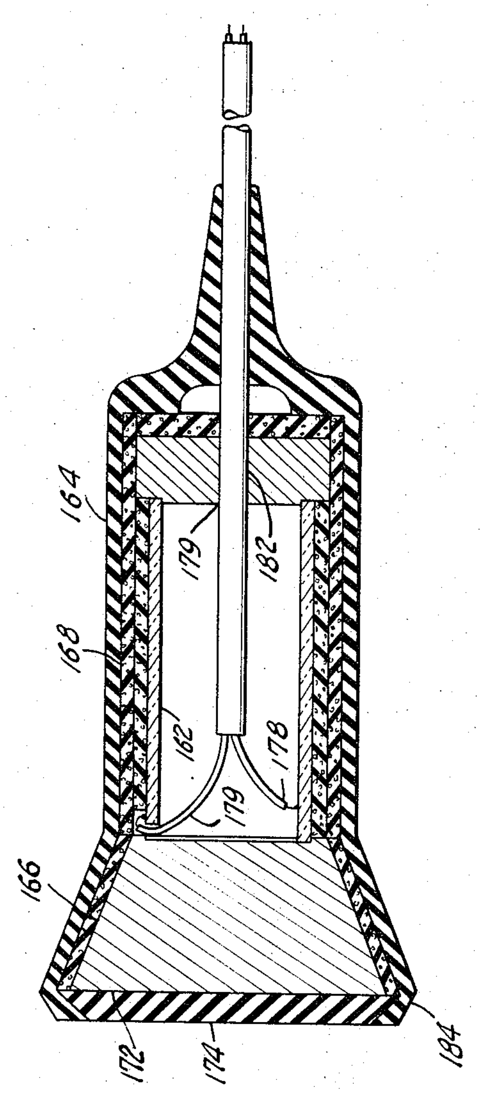
FIG. 9B is a sectional view of the transducer of this invention.
Figure 9A:
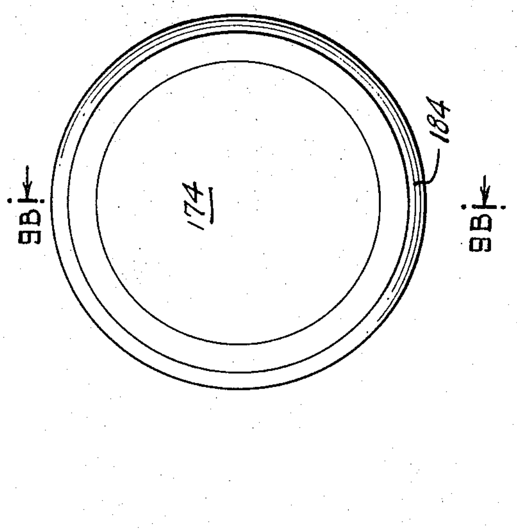
FIG. 9A is an end elevation of the transducer of this invention.

The transducer 42, shown in FIGS. 9A and 9B, is small whereby it is easily gripped manually. The outside dimensions of the transducer approximate those of a flashlight. The transducer includes a barium titanate cylinder 162 which has a longitudinal mode of vibration, and as usual its inner and outer peripheral surfaces have an adherent very thin layer of silver. A cylindrical metal loading means 164 somewhat larger than the diameter of the cylinder is cemented to one end of the barium titanate cylinder; brass has proven satisfactory for this purpose. A frusto-conical loading means 166 preferably of aluminum is cemented at its smaller end to the other end of the barium titanate cylinder and coaxially therewith and forms the active end of the transducer. Corprene which comprises cork and neoprene and can shield against mechanical vibrations is secured in the form of a fairly even layer 168 to the outside peripheral surface of the barium titanate cylinder, the circular and rear surfaces of the rear loading means, and the circular surface of the loading means 166 leaving the surface 172 of the loading means 166 free to radiate energy into the water and receive energy from the water. A neoprene disk 174 transparent to mechanical vibration energy is bonded to the surface 172 of the loading means 166 in a manner to preclude air spaces therebetween; this may be accomplished by methods known in the art, e.g., cyclewelding. An electric cable 176 including first and second leads 178 and 179 connected to the inner and outer surfaces respectively of the barium titanate cylinder 162 extends through a central hole 182 in the rear loading means. A neoprene boot 184 encases the transducer rendering it watertight. Because the transducer has directional response it may be manipulated to reduce volume during reception.

Figure 10:
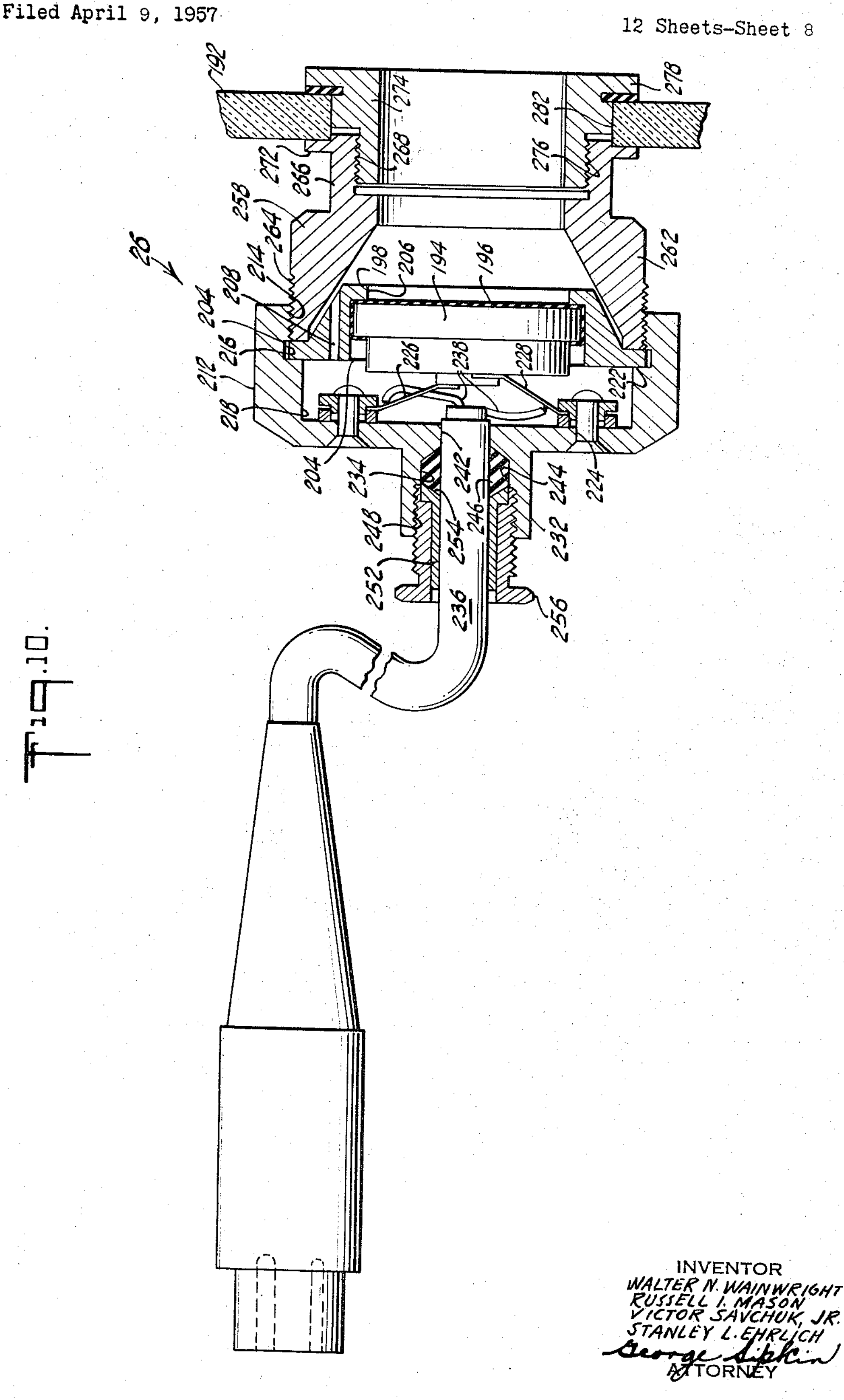
FIG. 10 is a sectional view of the underwater microphone of the invention.

The underwater michophone 26, shown in FIG. 10, is adapted for mounting on the transparent face plate 192 of a swimmer's mask. The active element of the microphone is a conventional carbon button 194. The diaphragm end surface of the carbon button is covered by a film 196 of latex rubber several thousandths of an inch thick. The latex film is cemented to the periphery of the carbon button structure; in cementing the latex film care is taken to exclude air from between the latex film 196 and the carbon button 194. A seating element 198 is provided for the carbon button. The seating element 198 has a circular flange 202 and a central bore 204 terminating in a circular lip 206. The latex-covered end of the carbon button 194 seats against the lip 206. A very small hole 208 is formed through the seating element. The hole is made as small as is practicable. The purpose of the hole is to permit gas leakage therethrough to equalize pressure on both sides of the carbon button diaphragm structure as is conventional.

The flange 202 of the seating element 198 is engaged on one side by a capping member 212. The capping member is hexagonal so that it may be readily gripped for rotation. The inside of the capping member is threaded at the open end 214. An annular recess 216 is formed just beyond the threaded portion. Beyond the annular recess 216 at 218, the inside of the capping member is of reduced diameter whereby a shoulder 222 is provided for the flange 202 of the seating element. Two holes 224 are drilled through the capping member and are countersunk on the outer side of the capping member. A first resilient contact 226 and a second resilient contact 228 are insulatedly mounted on respective rivets affixed in the holes 224. The rivets terminate flush with the outer surface of the capping member 212. The holes occupied by the rivets are rendered watertight by welding the heads of the rivets in the countersunk ends of holes 224. There extends from the outer side of the capping member 212 an axial sleeve-like portion 232 formed with a passage 234 for an electric cable 236. The wires 238 of the electric cable 236 terminate in electrical engagement with the resilient contacts 226 and 228. The diameter of the inner end portion of the passage 234 is just large enough for the cable 236 to pass through. The passage 234 tapers from its inner end portion 242 to an intermediate portion 244 of larger diameter for seating a packing element 246. The remaining portion 248 of the passage 234 is of slightly larger diameter than the intermediate portion and is threaded. The packing is engaged by a flanged sleeve 252 whose inside diameter is slightly larger than the cable 236. The flanged end 254 of the sleeve 252 is tapered. A compression nut 256 slidably engages the outside of the flanged sleeve and threadedly engages the sleeve-like portion of the capping member. The compression nut 256 forces the flanged end 254 of the sleeve 252 to compress the packing element 246 and thus provide a watertight seal in the passage.

The coupling 258 includes a larger diameter portion 262 that is externally threaded at its free end 264 and a smaller diameter portion 266 that is internally threaded at its free end 268 and further includes a flange 272 spaced slightly from the free end 268. The larger diameter portion 262 threadedly engages the capping element 212 for clamping the flange of the seating element against the shoulder 222 of the capping element 212. The other end of the coupling 258 seats in the opening of the transparent face plate 192 of the mask. A locking element 274 formed with an external thread 276 at one end, a flange 278 at the other end and an intermediate portion 282 of the same diameter as the opening in the transparent face plate of the mask engages the coupling 258 to secure the microphone 26 to the mask. Gaskets such as shown are employed as necessary. To each side of the intermediate portion 282 the locking element is undercut to permit the transparent face plate of the mask to be clamped.

The underwater microphone described is effective at a considerable depth below the surface of the water and above the surface of the water. In other words whether the swimmer is more than one hundred feet down or at the surface with his head above water, the underwater microphone will be operative.

Figure 11:
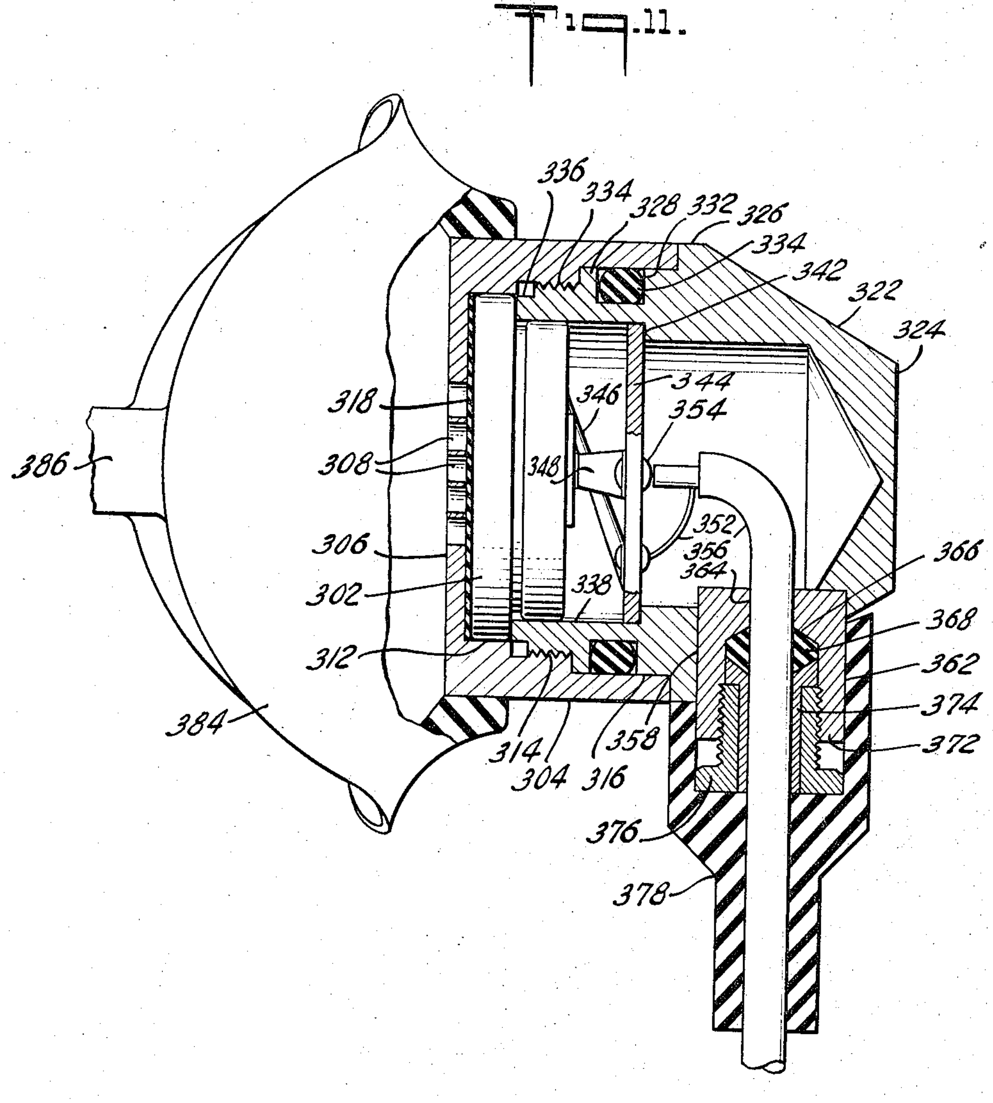
FIGS. 11 and 12 are sectional and front elevational views respectively of the head phones or receivers of the invention.
Figure 12:
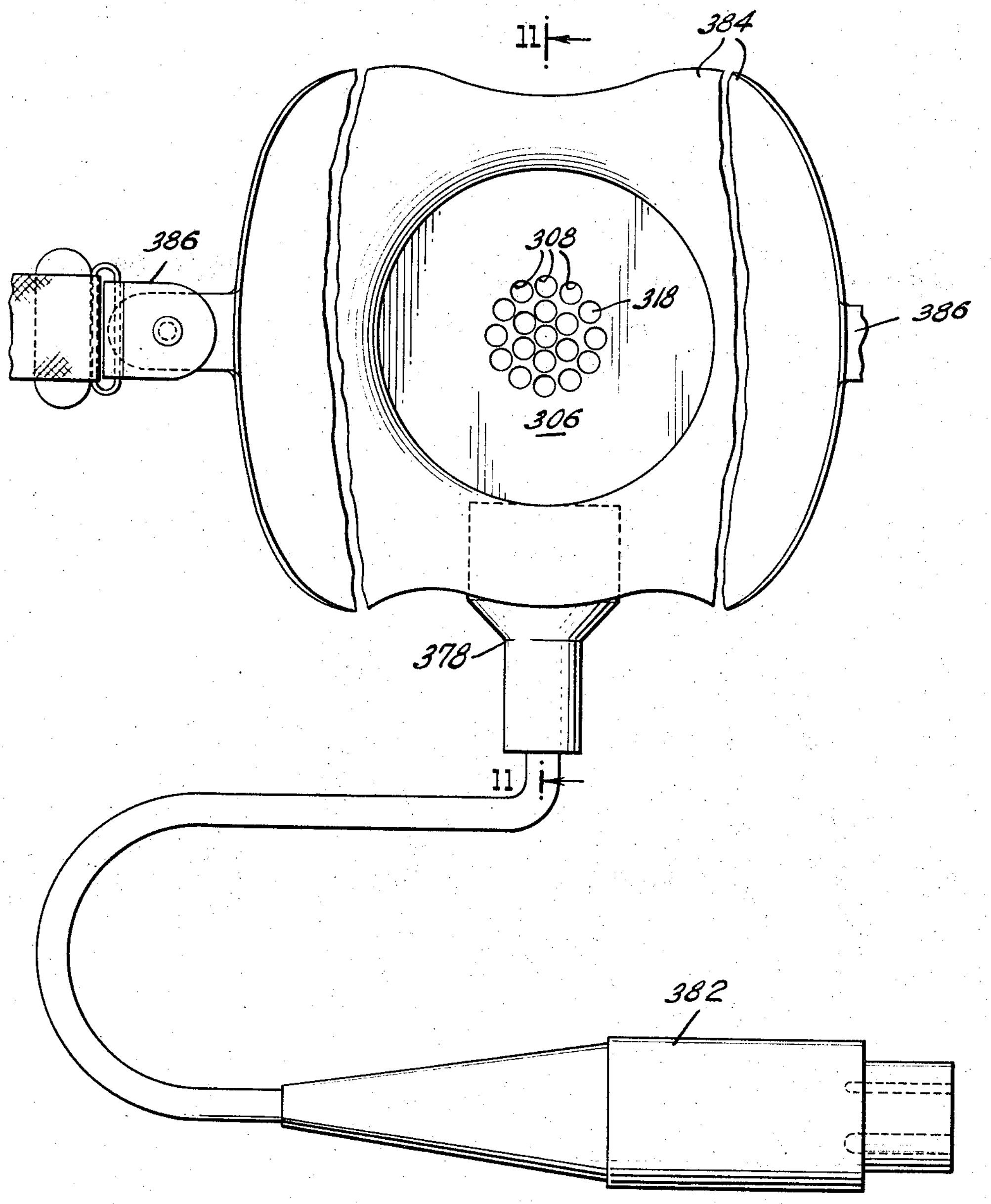

A modification of the microphone adapted for surface use only is shown in FIGS. 11 and 12. This modification is referred to as a surface microphone. The surface microphone is structurally similar to the underwater microphone. The active element is a carbon button 302 identical to that included in the underwater microphone. The carbon button seats in a cup-like member 304. At least the central portion of the end 306 of the cup-like member is perforated with holes 308. The inside diameter of the cup-like member is smallest at 312 adjacent the perforated end, is stepped to a larger diameter intermediate portion 314 that is threaded and is stepped again to a larger diameter portion 316 at the free end. A film of latex 318 is cemented to the perforated end of the cup-like member around but not over the hole area of the perforated end 306. The carbon button 302 seats against the latex film 318. The microphone includes a second cylindrical cup-like member 322. The second cup-like member is tapered adjacent its closed end 324 to minimize weight; its outside diameter intermediate the ends thereof at 326 is equal to the outside diameter of the first cup-like member 304. The outside diameter is stepped down from 326 to a portion 328 whose diameter is slightly smaller than that of the portion 316 of the first cup-like member 304. An annular slot 332 is formed in the portion 328 for seating compressible packing material 334. The outside diameter is stepped down further to the threaded portion 334 for threaded engagement with cup-like member 304 and is further stepped down at the end 336 to a diameter that is smaller than the diameter of the portion 314 of cup-like member 304 so that it can bear against the carbon button 302 as shown. The inside diameter at the open end portion 338 thereof supports a portion of the carbon button; the inside diameter is stepped down to provide an annular shoulder 342. An insulating disk 344 seats against the shoulder 342. A pair of resilient contacts 346 and 348 are mounted on the insulating disk for engaging the carbon button. The leads 352 and 354 of a cable 356 are electrically connected to the contacts. The cup-like member 322 is formed with a transverse opening 358 for the cable. A cylindrical element 362 with a constricted aperture 364 for the cable is secured by welding in the transverse opening 358 for watertightness. The cylindrical element 362 is formed with a seat 366 for compressible packing 368 and is internally threaded between the seat 366 and the open end 372 thereof. A flanged sleeve 374 slidable on the cable 356 engages the packing material. An externally threaded nut 376 forces the flanged sleeve 374 against the packing material 368 to provide a watertight seal. A sleeve 378 of rubber-like material surrounds the end of the cable and the adjacent portion of the microphone structure. The cable terminates in a waterproof connector 382. A rubber-like mask 384 is fixedly secured to the microphone structure by any suitable method preferably by cyclewelding. Attaching strap and buckle means 386 extend from the rubber-like mask.

The headset 32 is not shown in detail on the drawings. The significant feature of the headset 32 is that it includes bone conduction elements instead of the conventional magnetic elements. Bone conduction elements are well known in the art of audio engineering and particularly in the art of hearing aids. Bone conduction elements are used in this invention to preclude pressure differential across the eardrums of the swimmer. If a magetic headset, conventional for use in air, were used underwater, it would necessarily be sealed against the swimmer's ears and would operate into the air pockets in the ears. The swimmer's air supply which matches the pressure of the water regardless of depth would cause the eardrums of the swimmer to be pressed outwardly with force proportional to his depth and the swimmer's eardrums could rupture if he were to go deep enough in the water. Even if the danger of rupture did not exist the pressure on the swimmer's ears could be very disconcerting to him.

Because the biggest transverse measurement of the head is at the ears, the headset is preferably worn over the ears whereby the headset is retained securely on the head. The active elements are seated in rubber-like cushions as is conventional. If the size and characteristics of the rubber-like cushions are such that they effectively seal the swimmer's ears against the surrounding water it is necessary for the swimmer to pop each earpiece away from his ear as soon as he gets beneath the surface of the water so as to release the air captured in the ears; since water is substantially incompressbile, this need be done only once to protect the eardrums. The headset includes a cable and a waterproof connector similar to that provided for the microphone.

Figure 13:
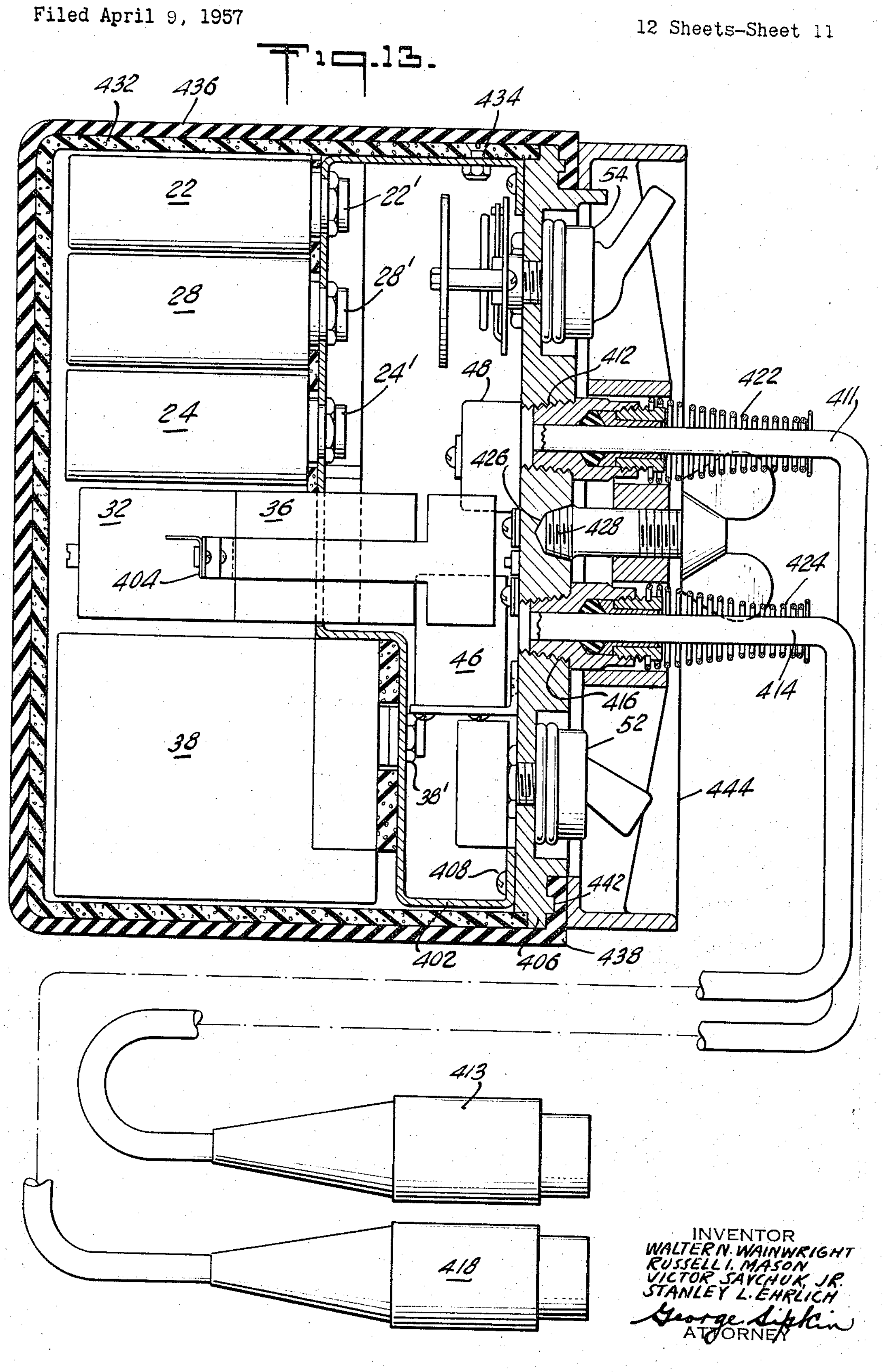
FIG. 13 is a sectional view of the transmitter-receiver assembly of this invention taken along the line 13—13 of FIG. 14.
Figure 14:
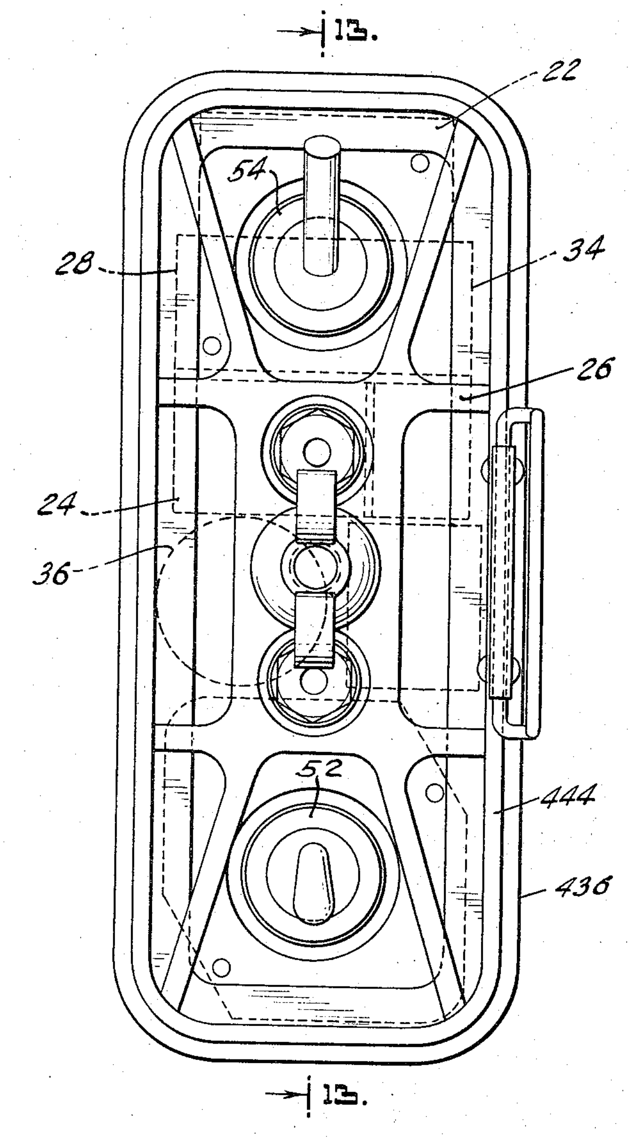
FIG. 14 is a top view of the transmitter-receiver assembly.

FIGS. 13 and 14 illustrate a preferred structural arrangement for the transmitter-receiver. Portions of the combination including wiring are omitted for clarity. A chassis frame 402 mounts a plurality of plug-in sockets. Some of the sockets such as 22', 24', 28', 38' and bracket means 404 are shown in FIG. 1. The power amplifier 36, the listening amplifier 38, the audio amplifier 28, the band-pass filter 34, the oscillator 22, the balanced modulator 24 are each structurally assembled as plug-in units; insofar as is practical, the units are each embedded in a plastic material to render the transmitter-receiver circuits as rugged as possible and to simplify repairs in the field. Each of the plug-in units seat in respective sockets. The battery pack 44 seats in sockets 38' and the battery pack or supply 44 seats in bracket 404. A control panel 406 is securely fastened to chassis frame 402 by fastening means 408. The choke 48, microphone transformer 46, and resistor 92 (not shown in FIGS. 13 and 14) are secured to the control panel 406. The switches 52 and 54 are mounted on the control panel 406 so that the switch actuators are on the outer side of the control panel. Each of the actuators are loosely sheathed in rubber to provide a waterproof seal without interfering with movement of the actuators. The switches are located at opposite ends of the control panel 406 to facilitate selection of the desired switch by the swimmer submerged in the water. Two cable openings 412 and 416 are formed through the control panel. The openings are tapered and threaded. The transducer cable 411 passes through opening 412; at its other end it terminates in a waterproof coupling 413; the microphone and heaset cable 414 pass through opening 416; at its other end it terminates in a waterproof coupling 418. Each of the openings 412 and 416 are rendered waterproof by pressure sealing structure similar to those described for the microphones in FIGS. 10 and 11. Coil springs 422 and 424 are attached to the waterproof sealing structure to protect the cables against extreme bends. The control panel 406 is formed with a central threaded recess 426. A stud 428 that is threaded at each end is secured in the recess 426. The assembly including chassis frame 402 and control panel 406 is housed in a fiberglass case 432. Fastening means 434 secure the chassis frame and the fiberglass case. A rubber boot 436 is fitted snugly over the fiberglass case. The open end of the rubber boot 436 is formed with an inwardly directed lip 438. A groove 442 is formed on the inner side of the lip 438. The periphery of the control panel 406 is shaped to provide a seat for the grooved lip of the rubber boot. A sealing clamp 444 is provided for securing the rubber boot 436. If necessary a sealing ring, not shown, is disposed between the sealing clamp and the rubber boot to enhance the seal. The entire unit approximates a small fat book in size. It is readily disassembled and assembled for changing batteries or servicing. A clip 446 is secured to the unit so that it may be clipped to a belt around the swimmer's waist.

In operation the microphone 26 is mounted by means of the mask close to the lips of the swimmer and the headset 32 is worn over the ears of the swimmer so as to be as secure as possible against slipping off his head. The transmitter-receiver assembly is clipped to his belt. The transducer is clipped to his belt at all times other than when he needs to manipulate it to take advantage of its directivity. In the interest of safety, new batteries are added each time the equipment is used. The cable connectors are all properly coupled to render the equipment operative before he enters the water. If the equipment is designed so that the radiated single sideband suppressed carrier energy is in the audio frequency range the equipment may be subjected to a simple test in air to ascertain whether or not the equipment is operative. The actuator of switch 52 is put in the on position. The actuator of switch 54 is normally in the receive position. If one finger is rubbed or scratched across the face of the transducer, a rasping sound is heard in the headset if the equipment is operating. The actuator of switch 54 is then moved to the transmit position and the swimmer speaks into the microphone; if the equipment is operating a variable frequency audible squeal is emitted by the transducer provided the single sideband suppressed carrier signal is within the audio frequency range. The actuator of the switch 54 is then moved to homing tone position; if the equipment is in the audio frequency range a constant frequency audible squeal is emitted by the transducer.

After the swimmer enters the water the switch 52 is actuated to on position. The switch 52 may be set in off position to conserve the batteries during any interval in which the equipment is not needed. With the switch 52 in on position and the switch 54 is left free, the equipment is set for receiving. Only two controls, namely switches 52 and 54 are provided. The equipment does not include a volume control; by limiting the equipment to two controls, the use of the equipment underwater by the swimmer is facilitated. Since the transducer 42 is directional, the swimmer can orient the transducer for volume control purposes; also the swimmer can shield the front of the transducer with his hand to reduce volume. With the switch 54 in receive position, the power amplifier 36 is not connected to the batteries 44A and 44B and thus is inactive and the microphone 26 and the primary of the microphone transformer 46 are not connected to the battery 44A whereby the microphone circuit is inactive. Vibrational signal energy reaching the transducer is converted into electrical signal energy. Choke 48 attenuates almost entirely all signal energy whose frequency is beyond the band of interest. The signal energy within the band of interest passes through the lead 118, the contactor **54*q*, the contact 54*p*, and the lead 88, into the listening amplifier 38. The amplified signal energy from the listening amplifier 38 passes through the lead 82, the contact 54*k*, the contactor 54*l*, lead 116 into the band pass filter 34 wherein energy outside the band of interest is attenuated. The signal energy within the band of interest thence passes through lead 124 to the balanced modulator 24; energy from oscillator 22 passes through the lead 117, the contactor 54*u***, the contact $54t$, the lead 96 into the balanced modulator 24. The balanced modulator 24 converts single sideband suppressed carrier signal energy into intelligence. The intelligence from the balanced modulator 24 passes through the lead 122, contact $54y$, contact 54, and lead 98 to the audio amplifier 28, and thence through the headset 32 to ground.

To transmit, the actuator of switch 54 is moved to transmit position and firmly retained in that position against the bias of the spring urging the switch actuator to receive position. When the actuator of switch 54 is in transmit position, the listening amplifier 38, and the audio amplifier 28 are disconnected from the batteries 44A and 44B, the power amplifier 36 is connected to the batteries 44A and 44B, and the microphone circuit is connected to the battery 44A. Since the audio amplifier is not energized, the headset 32 is not energized. When the swimmer speaks into the carbon button microphone 32, the speech energy is converted from vibration energy into electrical energy. The energy in the microphone circuit is coupled by the transformer 46 into the balanced modulator 24 via the lead 102, contact 54z, and lead 122. Carrier frequency energy from the oscillator 22 passes through lead 117, contactor 54u, lead 96 into the balanced modulator 24; the speech energy is modulated on the carrier and the carrier suppressed. The energy in the sidebands produced by the balanced modulator passes through lead 124 into the band pass filter 34 wherein one of the sidebands is suppressed. The remaining single-sideband suppressed carrier energy passes from the bandpass filter 34 through lead 116, contactor $54l$, contact $54m$, lead 84, into the power amplifier 36. The amplified single-sideband suppressed-carrier energy from the power amplifier 36 passes through lead 86, contact $54r$, contactor $54q$, lead 118, choke 48, to transducer 42 and thence through lead 144 to ground. The energy is radiated by transducer 42 into the surrounding medium. When the actuator of switch 54 is moved to homing tone position and firmly retained in that position, the listening amplifier 38, the audio amplifier 28, and the microphone 26 and the primary of transformer 46 are not energized. The headset 16 is not energized since the audio amplifier is not energized. The balanced modulator 24 and the bandpass filter 34 are not connected in the circuit; the contactors $54l$ and $54y$ that terminate leads 116 and 122 from the bandpass filter 34 and the balanced modulator 24 respectively, engage contacts $54j$ and $54w$ that are not electrically connected to any part of the circuit. The energy output of the oscillator 22 passes through lead 117, contactor $54u$, contact $54t$, resistor 92, lead 94, lead 84 to the power amplifier. The amplified constant frequency energy from the power amplifier 36 passes through lead 86, contact $54n$, contactor $54q$, lead 118, choke 48, the transducer 42, lead 144 to ground. The homing tone energy is radiated by the transducer into the surrounding medium.

When the swimmer decides to return to the mother ship or the shore base, he operates his equipment so that atlernately he transmits a homing tone which is a constant frequency constant amplitude tone, and receives advice concerning his direction as he proceeds back to base. In other words, the swimmer moves the actuator of switch 54 to homing tone position and holds it there firmly against the urging of the biasing spring for a length of time that is adequate for the prevailing conditions. When the swimmer releases the actuator of switch 54, the actuator returns to receive position; the swimmer is advised whether to proceed straight ahead, or to move toward the right or toward the left. Alternate transmission of homing tone and reception of advise is continued for as long as is necessary.

Obviously many modifications and variations of the present invention are possible in the light of the above teachings. It is therefore to be understood that within the scope of the appended claims the invention may be practiced otherwise than as specifically described.

We claim:

1. An underwater telephone for underwater swimmers comprising, an underwater transducer, a face mask to be worn by a swimmer, an underwater microphone mounted on said mask, an underwater headset, transmitter-receiver means connected to said transducer, microphone and headset and operable for transmitting voice signals from said microphone into water vibrations by said transducer and receiving vibrations from the water through said transducer and transmitting them to said handset, said face mask having an aperture, a casing coupled to said mask along the periphery of said aperture, and extending forwardly outside of the mask, a cup shaped element having its open end detachably clamped to and closing the forward end of said casing, a seating element disposed across the open end of said casing and clamped in that position between said casing and cup shaped element, said seating element having an aperture therethrough from face to face, a carbon button secured in and closing said aperture in said seating element, and a cable entering said cup shaped element and having circuit terminals connected to said carbon button, said seating element having a small passage from face to face therethrough at one side of the aperture in that element for permitting equalization of static fluid pressure on opposite faces of said carbon button.

2. An underwater telephone for underwater swimmers comprising, an underwater transducer, a face mask to be worn by a swimmer, an underwater microphone mounted on said mask, an underwater headset, transmitter-receiver means connected to said transducer, microphone and headset and operable for transmitting voice signals from said microphone into water vibrations by said transducer and receiving vibrations from the water said transducer and transmitting them to said headset, said mask having an opening therethrough in approximate alignment with and in front of the mouth of a swimmer wearing the mask, and said microphone comprising a hollow casing secured to said mask on the exterior thereof, bridging and closing said mask opening and impervious to entry of water from the exterior of said mask, a carbon microphone button, and means mounting said button in said casing facing said mask opening and having a passage between the portions of said casing at opposite faces of said button to continuously equalize the air pressure on both faces of said button, and circuit connections from said button to the exterior of said mask and hollow casing.

3. The telephone according to claim 2, and a thin impervious film of elastic latex covering and abutting flat against that face of said button toward said mask, and sealed to a marginal portion of said button.

4. The telephone according to claim 3, wherein air is substantially excluded from the space between said film and the face of the button which it covers.

5. An underwater telephone for underwater swimmers comprising, an underwater transducer, a face mask to be worn by a swimmer, an underwater microphone mounted on said mask, an underwater headset, transmitter-receiver means connected to said transducer, microphone and headset and operable for transmitting voice signals from said microphone into water vibrations by said transducer and receiving vibrations from the water through said transducer and transmitting them to said headset, said mask having an opening therethrough in approximate alignment with the mouth of a swimmer wearing such mask, and said microphone comprising an open ended sleeve secured at one end to said mask, surrounding said opening and extending away from said mask, a cap detachably coupled to and closing the outer open end of said sleeve, a seating ring confined to the open end of said sleeve by said cap, a carbon microphone button secured at its periphery in the opening of said ring and facing said mask opening, said ring having an open passage therethrough from face to face thereof, through which passage air may pass between the faces of the carbon button to equalize the normal atmospheric pressure on both faces of the button, and circuit connections passing into the casing formed of said sleeve and cap at the face of said button opposite from said mask and there terminating in spring contacts that engage and cooperate with said button to establish circuit connections thereto.

6. The telephone according to claim 5, and a thin, impervious film of elastic latex covering and abutting flat against that face of said button toward said mask, and having its margin sealed to the periphery of said button.

7. In an underwater telephone of the type having an underwater transducer through which sound signals may be propagated through water, and sound signals that are propagated through the water picked up and converted into electric signals, an underwater microphone, a swimmer's face mask mounting said microphone, an underwater headset, and electric circuit means connecting said transducer, said microphone, and said headset, that improvement in said microphone which comprises said mask having an aperture in the portion thereof in front of the wearer's mouth when the mask is worn, two sleeves abutting opposite faces of said mask and coupled together and forming a conduit through said face mask at said aperture, a cap detachably coupled to the outer end of that sleeve which abuts the exterior of said mask, an annular member having a peripheral flange disposed and clamped between said cap and the end of the sleeve to which the cap is coupled, a carbon button secured in the opening of said annular member, an electric cable passing through and sealed to said cap, and electrically connected to said button to provide an electric circuit through said button, and an impervious film of latex extending across and covering that face of the button towards said mask and sealed to the peripheral portion of the button, with some air removed from the space between the face of the button and the latex film, said annular member having a small passage from face to face thereof eccentric to the opening of the annular part, to equalize atmospheric pressure on opposite sides of said button.

8. An underwater telephone comprising an underwater transducer through which received electric signals may be converted into sounds and propagated through water, a swimmer's face mask having a transparent front panel with an opening therein, a tubular element secured at one end to said panel in alignment with said opening and having a lengthwise passage forming a conduit from the inside of said mask through said panel opening to the outer end of said element, a cap detachably coupled to and closing the outer free end of said element, an annular member disposed in said conduit and having its periphery confined to said element by said cap, an electric cable passing through and sealed to said cap and having electric wires terminating adjacent the inner face of said cap, a transmitter button secured in the center space of said annular member and having circuit terminals connected to said cable wires, and telephone circuit means including therein said transducer, said cable wires, said button and a source of electrical current.

References Cited

UNITED STATES PATENTS

| | | | |
|---|---|---|---|
| 353,940 | 12/1886 | Hayes | 179—156 |
| 2,069,242 | 2/1937 | Graham | 340—8 |
| 2,388,674 | 11/1945 | Browne | 61—70 |
| 2,410,806 | 11/1946 | Black | 340—8 |
| 2,414,405 | 1/1947 | Bierman | 128—141 |
| 2,423,459 | 7/1947 | Mason | 340—10 |
| 2,439,408 | 4/1948 | Mitchell | 250—13 |
| 2,439,411 | 4/1948 | Mitchell | 250—13 |
| 2,616,223 | 11/1952 | Jonker | 340—10 |
| 2,638,577 | 5/1953 | Harris | 340—10 |
| 2,681,389 | 6/1954 | Shaper | 179—156 |
| 2,797,399 | 6/1957 | Camp et al. | 340—8 |
| 2,798,902 | 7/1957 | Kursman | 340—5 |
| 2,803,807 | 8/1957 | Butler | 340—8 |
| 2,861,568 | 11/1958 | Quilter et al. | 128—141 |
| 2,868,195 | 1/1959 | Finken | 128—141 |
| 2,876,766 | 3/1959 | Rebikoff et al. | 128—141 |

FOREIGN PATENTS

| | | |
|---|---|---|
| 876,747 | 8/1942 | France. |

OTHER REFERENCES

Index of Specifications and Standards (used by) Department of the Navy, Military index volume III, Oct. 1, 1958, page i, and page 412.

MIL-C-17831 A (Ships), Military Specification Communication Set, Sonar, Swimmer's Underwater Telephone, Dec. 10, 1953.

RODNEY D. BENNETT, *Primary Examiner.*

NORMAN H. EVANS, CHESTER L. JUSTUS, *Examiners.*

J. W. DESIMONE, D. G. REDINBAUGH, P. H. BLAUSTEIN, D. G. BREKKE, A. E. HALL, R. A. FARLEY, *Assistant Examiners.*